United States Patent [19]
Yoneda et al.

[11] Patent Number: 5,271,187
[45] Date of Patent: Dec. 21, 1993

[54] NUMERICALLY CONTROLLED GRINDING MACHINE

[75] Inventors: Takao Yoneda, Nagoya; Yasuji Sakakibara, Hekinan; Moriaki Sakakura, Nagoya; Naoki Arimoto, Takahama; Mamoru Katsuta, Nagoya; Yutaka Hayashi, Kariya; Masashi Yamanaka, Kariya, all of Japan

[73] Assignee: Toyoda Koki Kabushiki Kaisha, Kariya, Japan

[21] Appl. No.: 766,214

[22] Filed: Sep. 27, 1991

[30] Foreign Application Priority Data

Sep. 28, 1990 [JP] Japan ............................ 2-262267
Sep. 30, 1990 [JP] Japan ............................ 2-263410

[51] Int. Cl.⁵ ............................................. B24B 51/00
[52] U.S. Cl. .............................. 51/165.87; 51/105 SP; 51/165.71; 364/474.06
[58] Field of Search ........ 51/165.71, 165.87, 165.88, 51/105 SP, 325, 327; 125/11.01, 11.06; 364/474.06, 474.17

[56] References Cited

U.S. PATENT DOCUMENTS

| 4,498,259 | 2/1985 | Yamamoto et al. ......... 364/474.06 |
| 4,736,326 | 4/1988 | Akabane et al. ............. 51/165.87 |

FOREIGN PATENT DOCUMENTS

| 0098970 | 1/1984 | European Pat. Off. . |
| 0139280 | 5/1985 | European Pat. Off. . |
| 0224735 | 6/1987 | European Pat. Off. . |
| 3316244 | 2/1984 | Fed. Rep. of Germany . |
| 3318776 | 3/1984 | Fed. Rep. of Germany . |
| 3345269 | 6/1984 | Fed. Rep. of Germany ......... 364/474.06 |
| 0011496 | 1/1977 | Japan ............................ 51/165.87 |
| 58-92008 | 6/1983 | Japan . |
| 0723514 | 3/1980 | U.S.S.R. ...................... 364/474.06 |

*Primary Examiner*—Robert A. Rose
*Attorney, Agent, or Firm*—Oblon, Spivak, McClelland, Maier & Neustadt

[57] ABSTRACT

An apparatus capable of automatically determining grinding wheel dressing timing for dressing a grinding wheel. The apparatus estimates the abrasion of the grinding wheel in a grinding cycle on the basis of machining data and grinding conditions, and divides the grinding cycle into a plurality of stages according to the estimated abrasion to carry out grinding wheel dressing after the completion of every stage of the grinding cycle. In grinding a workpiece having a plurality of ground sections, the abrasion of the grinding wheel in grinding each ground section is estimated, and the abrasion is accumulated in accordance with grinding sequence. A ground section after grinding which grinding wheel dressing is to be carried out is determined on the basis of the cumulative abrasion. Similarly, the abrasions are accumulated for each of workpieces. A grinding wheel dressing is carried out after the completion of grinding a workpiece so that the cumulative abrasion may not exceed a predetermined value.

9 Claims, 17 Drawing Sheets

FIG. 13

| GROUND SECTIONS W(k) / PARTICULARS | 1 | 2 | 3 | 4 | 5 |
|---|---|---|---|---|---|
| GRINDING CYCLES | END SURFACE & TRAVERSE GRINDING | PLUNGE CUT CYLINDER GRINDING | END SURFACE PLUNGE CUT GRINDING | ROUND END SURFACE PLUNGE CUT GRINDING | TAPER GRINDING |
| GRINDING CYCLE DIVISION | UNNECESSARY | UNNECESSARY | NECESSARY | UNNECESSARY | UNNECESSARY |
| GRINDING SEQUENCE | 1 | 2 | 3 | 4 | 5 |
| GRINDING CONDITIONS | INFEED FOR ROUGH GRINDING INFEED RATE FOR ROUGH GRINDING INFEED FOR FINE GRINDING ... | ............ | ............ | ............ | ............ |
| INTERMEDIATE WHEEL DRESSING | | NECESSARY | | | |
| WHEEL DRESSING INTERVAL | | | | | |
| WHEEL DRESSING CONDITIONS | NUMBER OF STROKES DEPTH OF CUT | GRINDING WHEEL DRESSING SPEED | | | |

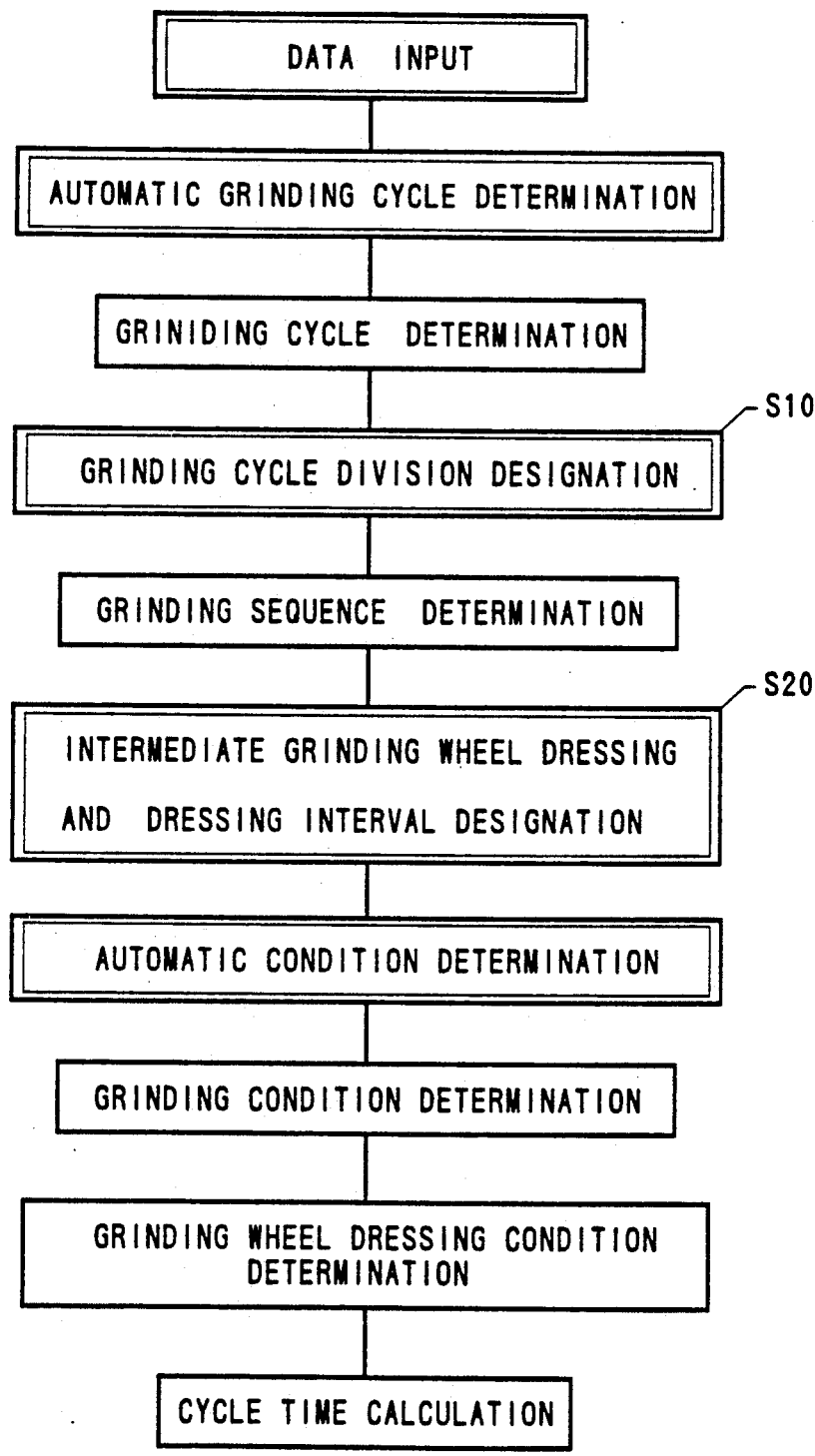

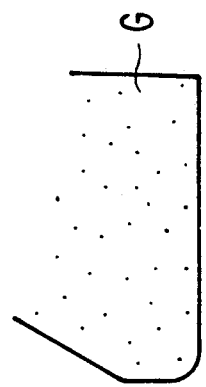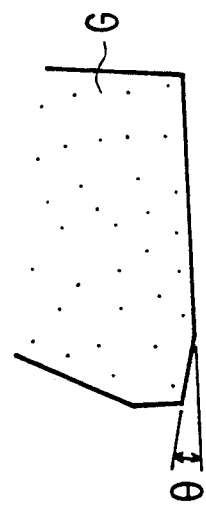
FIG. 17 (a)　FIG. 17 (b)　FIG. 17 (c)

NUMERICALLY CONTROLLED GRINDING MACHINE

BACKGROUND OF THE INVENTION

1. Field of the Invention

The present invention relates to a numerically controlled grinding machine capable of automatically determining a timing for dressing a grinding wheel and other grinding data.

2. Description of the Prior Art

In grinding a workpiece, each ground section (stage) of the workpiece is finished by one grinding cycle comprising a series of grinding steps, i.e., a rapid feed, a rough grinding, a fine grinding and a finish grinding, which differ from each other in an infeed rate and a grinding accuracy.

The grinding cycle for grinding each ground section of the workpiece is divided into two stages, if a desired finished accuracy can not be obtained. This judgment is carried out based upon the type of the grinding wheel employed, the grinding allowance and required surface accuracy of the ground section. And a grinding wheel dressing step is inserted between the two divided stages.

In grinding a workpiece having a plurality of ground sections, such as a multi-stage spindle, the grinding wheel may be dressed after finishing one of the ground sections before starting grinding the next one of the ground sections, because the ground sections are ground respectively in different grinding modes, such as a traverse grinding mode and a plunge cut grinding mode, and an amount to be ground by the grinding wheel increases with respect to the number of the ground sections.

However, no criterion has been established for deciding whether or not the grinding cycle must be divided into two stages and the grinding wheel dressing step must be inserted between the two divided stages, or whether or not the grinding wheel dressing step must be inserted between the grinding cycles for grinding the successive ground sections in grinding a workpiece having a plurality of ground sections. Such a decision has been dependent on the experience of the operator. Accordingly, there is such a problem that a frequency of the grinding wheel dressing is dependent on the judgment of the respective operators and as a result a machining time and a finished accuracy of the workpiece are dependent on the skill and experience of the respective operators.

There is known a grinding data producing apparatus capable of producing grinding data necessary for the automatic operation of a numerically controlled grinding machine, including grinding conditions, such as a grinding infeed rate, a rotating speed of a workpiece, grinding modes, a grinding sequence, grinding wheel dressing conditions and a grinding wheel dressing interval.

This grinding data producing apparatus determines the grinding data by a procedure shown in FIG. 14.

This procedure requires the operator to decide in step S10 after the determination of grinding modes whether or not the grinding cycle is to be divided to insert the grinding wheel dressing step between the two divided grinding stages.

The operator determines whether or not each ground section can continuously be ground and finished without dressing the grinding wheel during the grinding cycle, on the basis the abrasion of the cutting face of the grinding wheel that is empirically estimated by the operator according to the grinding cycle.

After the determination of a grinding sequence specifying the grinding order among the ground sections, the operator decides empirically in step S20 whether or not the continuous grinding of all the ground sections of the workpiece is possible without an intermediate dressing of the grinding wheel.

If it is decided that the grinding of all the ground sections is possible without the intermediate grinding wheel dressing, the operator decides empirically the number of workpieces that can be finished without the grinding wheel dressing, namely, a grinding wheel dressing interval.

Since the known grinding data producing apparatus requires decisions to be made by the operator, full automatic determination of the grinding data is impossible.

SUMMARY OF THE INVENTION

Accordingly, it is an object of the present invention to enable automatically deciding whether or not a grinding cycle needs to be divided to insert a grinding wheel dressing step in the grinding cycle.

Another object of the present invention is to enable automatically deciding whether or not a grinding wheel dressing step needs to be inserted between successive grinding cycles in grinding a workpiece having a plurality of ground sections.

A further object of the present invention is to enable automatically deciding all the grinding data necessary for controlling the numerically controlled grinding machine including data for the automatic insertion of a grinding wheel dressing step.

In a first aspect of the present invention, a numerically controlled grinding machine comprises abrasion estimating means for estimating the abrasion of a grinding wheel during a grinding cycle on the basis of machining data and grinding conditions, grinding cycle dividing means for dividing the grinding cycle into a plurality of grinding stages, dressing executing means for executing a dressing operation of the grinding wheel after the completion of each of the divided grinding stages.

The abrasion of the grinding wheel is estimated on the basis of the machining data and the grinding conditions to decide whether or not the grinding cycle must be divided. If the grinding cycle is divided into a plurality of grinding stages, the grinding wheel is dressed between the successive divided grinding stages.

In a second aspect of the present invention, a numerically controlled grinding machine comprises grinding amount calculating means for calculating an allowable grinding amount, i.e., a theoretical amount where a grinding wheel could grind a workpiece within a predetermined surface roughness, and an actual grinding amount, i.e., an estimated and accumulated amount where the grinding wheel will actually grind a workpiece, for each grinding cycle on the basis of machining data and grinding conditions, and grinding cycle dividing means for dividing the grinding cycle into a plurality of grinding stages so that the actual grinding amount in each of the divided grinding stage is not greater than the allowable grinding amount, when the actual grinding amount in the grinding cycle is greater than the allowable grinding amount.

According to the present invention, the grinding cycle is divided into a plurality of grinding stages on the basis of the relation between the estimated actual grinding amount and the allowable grinding amount in grinding the surface of the workpiece with the predetermined surface accuracy.

In a third aspect of the present invention, a numerically controlled grinding machine is characterized in a decision as to whether or not a grinding wheel dressing step needs to be inserted in a grinding cycle during grinding each of ground sections. For such a purpose the numerically controlled grinding machine comprises abrasion estimating means for estimating the abrasion of the grinding wheel during the machining of each of the ground sections, and accumulative abrasion estimating means for estimating an accumulative abrasion of the grinding wheel in grinding each of the ground sections according to a grinding sequence.

In a fourth aspect of the present invention, a numerically controlled grinding machine comprises damage ratio calculating means for calculating a damage ratio representing the degree of damages that a grinding wheel suffers in grinding each of ground sections on the basis of an actual grinding amount and an allowable grinding amount, damage ratio accumulating means for accumulating the damage ratios according to grinding sequence for each of the ground sections, and intermediate dressing position determining means for determining at least one ground section in which the grinding wheel is to be dressed after grinding the same ground section.

This numerically controlled grinding machine determines the ground section in which the grinding wheel dressing operation is to be carried out after grinding the same ground section on the basis of the magnitude of the accumulative damage ratio.

In a fifth aspect of the present invention, a numerically controlled grinding machine is characterized in determining the number of workpieces before dressing a grinding wheel. For such a purpose, the numerically controlled grinding machine comprises abrasion accumulating and estimating means for accumulating abrasions of the grinding wheel for respective ground portions and respective workpieces. A grinding wheel dressing step is inserted in a successive grinding process after completing grinding the last workpiece where the accumulative abrasion may not exceed a predetermined value.

In a sixth aspect of the present invention, damage rations representing damages that the grinding wheel suffers in grinding each of ground sections are calculated on the basis of an actual grinding amount and an allowable grinding amount. The calculated damage ratios are accumulated for all the ground portions of one of workpieces and further the accumulated damage ratios are accumulated for the respective workpieces. A grinding wheel dressing step is inserted in the grinding process after completing grinding the last workpiece where the accumulative damage ratio may not exceed a predetermined value.

In a seventh aspect of the present invention, a method and apparatus determine a grinding cycle, grinding conditions, a division of a grinding cycle for each ground section, a grinding sequence among ground sections, an intermediate grinding wheel dressing timing in the grinding sequence, grinding wheel dressing conditions and a grinding wheel dressing interval in that order.

According to the present invention, the division of the grinding cycle can automatically be decided, because the decision as to whether or not the grinding cycle is to be divided is made after the determination of the grinding cycle and grinding conditions and hence the calculation for the estimation of the abrasion of the cutting face of a grinding wheel is possible.

The intermediate grinding wheel dressing timing in the grinding sequence can automatically be determined, because it is determined after determining the grinding conditions and the grinding sequence and hence the calculation for the estimation of the abrasion of the cutting face of a grinding wheel is possible.

Furthermore, a grinding wheel dressing interval can automatically be determined because the grinding wheel dressing interval is determined after the determination of the necessity of the intermediate grinding wheel dressing and the determination of the grinding conditions and the grinding wheel dressing conditions.

Thus, the method in accordance with the present invention is capable of automatically determining all the grinding data.

BRIEF DESCRIPTION OF THE DRAWINGS

FIG. 13 is a table of particulars determined by a method embodying the present invention;

FIG. 14 is a flow chart of a conventional grinding data determining procedure;

FIGS. 17($a$), 17($b$) and 17($c$) are fragmentary views of grinding wheels for machining the ground sections of a workpiece.

DESCRIPTION OF THE PREFERRED EMBODIMENT

The present invention will be described hereinafter with reference to a preferred embodiment thereof.

(1) Construction of Numerically Controlled Grinding Machine

Figure 1:
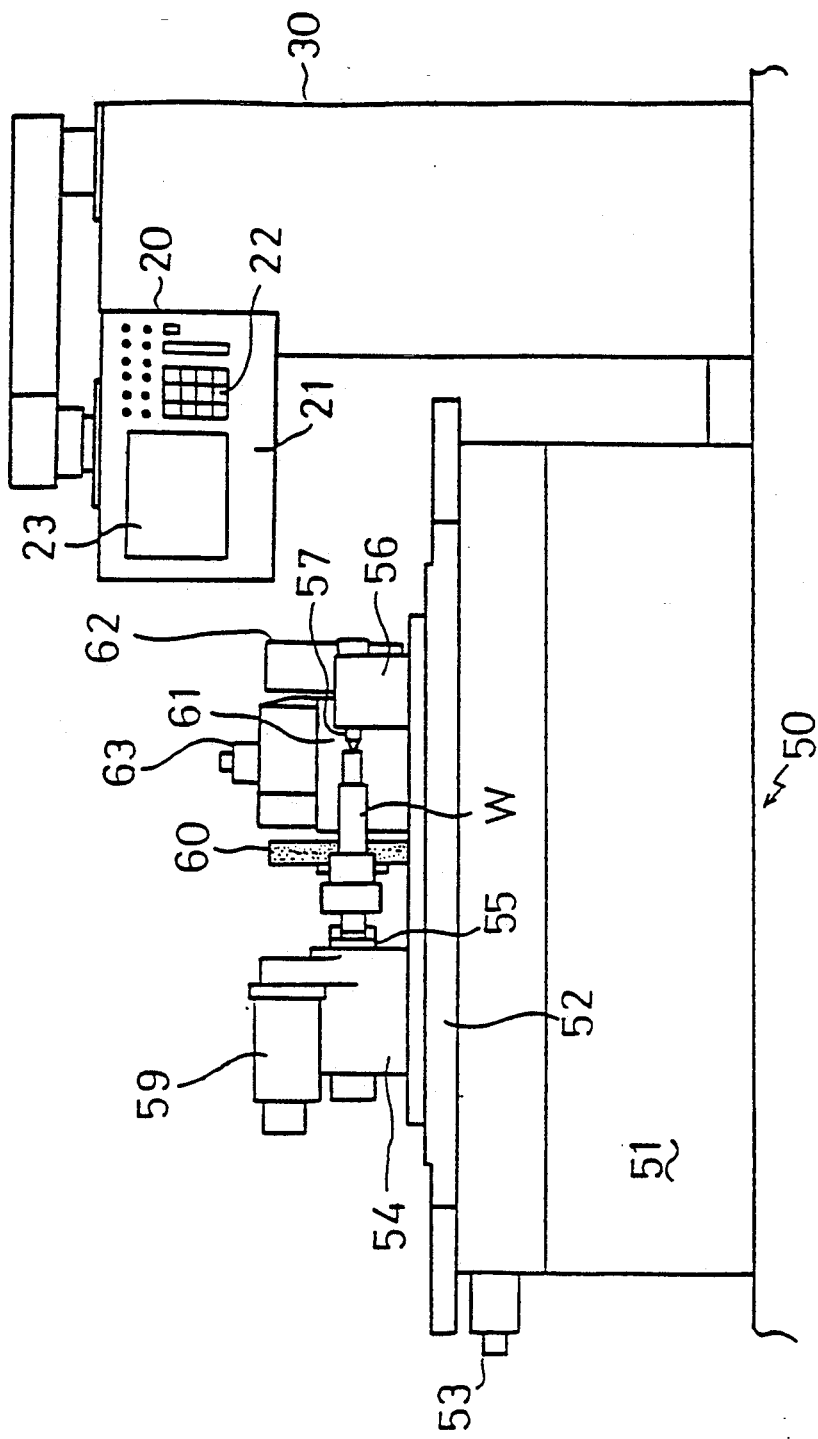
FIG. 1 is a view showing the general construction of a numerically controlled grinding machine in a preferred embodiment according to the present invention for carrying out a method in accordance with the present invention.

FIG. 1 is a view showing the general construction of a numerically controlled grinding machine equipped with an automatic machining condition determining apparatus in accordance with the present invention.

A numerically controlled grinding machine 50 has a bed 51 and a sliding table 52 mounted on the bed 51.

The sliding table 52 is driven for longitudinal sliding (lateral reciprocation as viewed in FIG. 1) by a table feed motor 53. A headstock 54 having a main spindle 55, and a tailstock 56 having a tailstock spindle 57 are disposed on the sliding table 52. A grinding wheel dressing device, not shown, is attached to the tailstock 56.

A workpiece W is supported between the main spindle 55 and the tailstock spindle 57 and is driven for rotation by the main spindle 55. The main spindle 55 is rotated by a main spindle motor 59 mounted on the headstock 54.

A grinding wheel 60 for grinding the workpiece W is mounted fixedly on the driving shaft, which is rotated by a grinding wheel driving motor 62 provided on a grinding wheel spindlestock 61. The grinding wheel spindlestock 61 is driven for movement in directions perpendicular to the sliding direction of the table 52 by a grinding wheel spindlestock feed motor 63.

A numerical control unit 30 controls the operation of the table feed motor 53, the grinding wheel spindlehead feed motor 63, the main spindle motor 59 and the grinding wheel driving motor 62.

(2) Construction of the Numerical Control Unit

Figure 2:
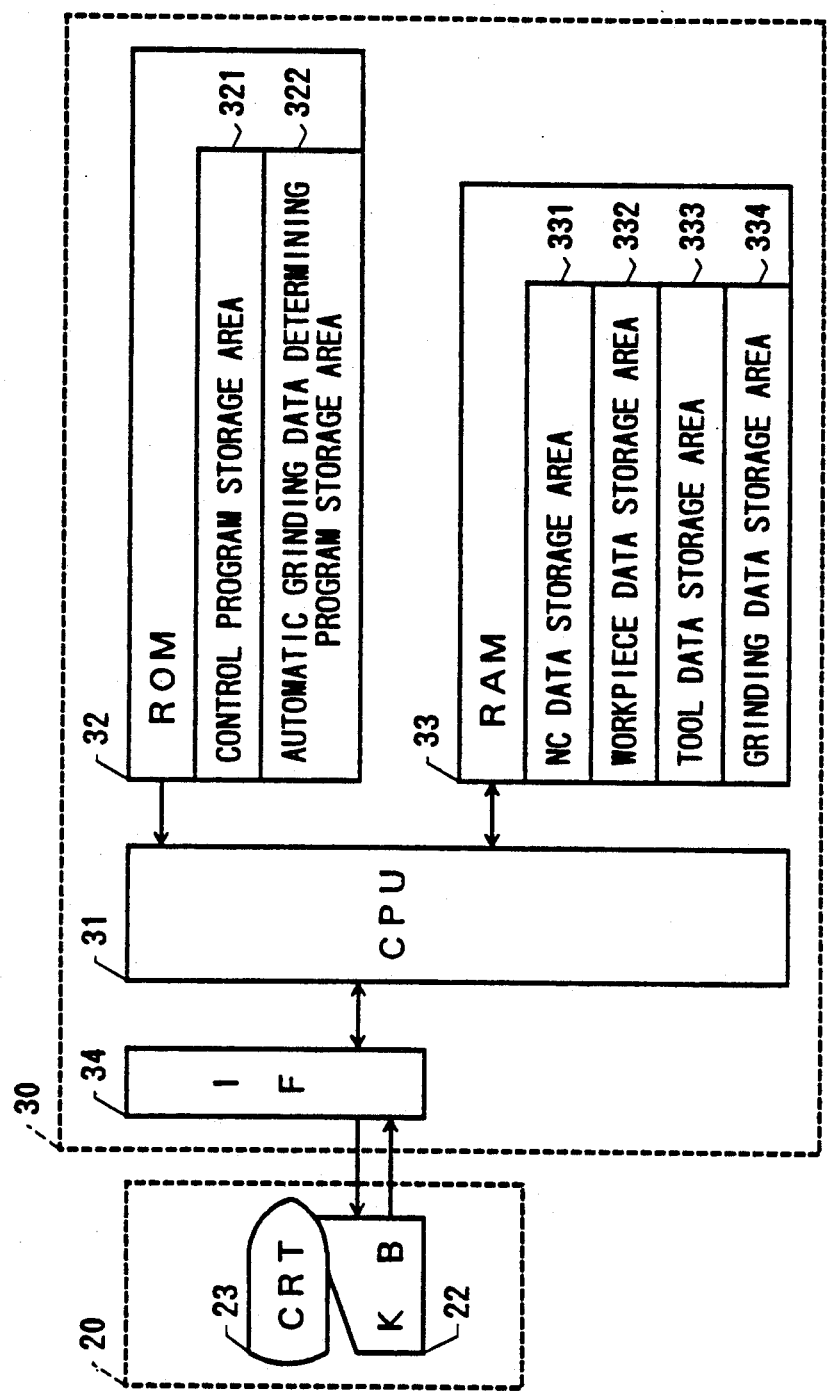
FIG. 2 is a block diagram of a numerical control system incorporated into the numerically controlled grinding machine of FIG. 1.

Referring to FIG. 2, the numerical control unit 30 comprises, as principal components, a CPU 31, a ROM 32, a RAM 33 and an IF (interface) 34.

The RAM 33 has an NC data storage area 331 for storing NC programs, a workpiece data storage area 332 for storing workpiece data, a tool data storage area 333 for storing tool data, and a grinding data storage area 334 for storing grinding data. The workpiece data are those defining the attributes of the workpiece, such as surface roughness, dimensional tolerances, finished diameters, dimensions, forms, machining allowances, material, sizing requirement and rigidity. The tool data are those defining the attributes of the tool, such as a grinding wheel speed, a grain size, a shape of cutting face and an abrasive type. The grinding data include grinding condition data, grinding cycle data, grinding cycle dividing data, grinding sequence data, an intermediate grinding wheel dressing timing, grinding wheel dressing conditions and a grinding wheel dressing interval.

The grinding condition data defines grinding conditions represented, for example, by a rotational speed of a workpiece for a rough grinding (a rough grinding workpiece speed), a fine grinding workpiece speed, a finish grinding workpiece speed, a rough grinding starting diameter, a finish grinding starting diameter, a rough grinding wheel speed, a finish grinding wheel speed, a rough grinding sparking-out time and a finish grinding sparking-out time.

The grinding cycle data specifies, for each ground section, a grinding cycle corresponding to a selected grinding mode which is selected from plural grinding mode, i.e., a plunge cut grinding, a traverse grinding, an end grinding, a convex rounding grinding, a taper grinding and the like.

The grinding cycle dividing data specifies whether or not a grinding wheel dressing step needs to be inserted between grinding steps during the grinding of a ground section according to the grinding cycle data, namely, whether or not a grinding wheel dressing step needs to be executed after the rough grinding before starting the fine grinding or finish grinding.

The grinding sequence data specifies the grinding order among the ground sections.

The grinding wheel dressing conditions are those for a grinding wheel dressing operation including a depth of infeed for dressing the grinding wheel and a grinding wheel speed for dressing.

The grinding wheel dressing interval is represented by the number of workpieces which can successively be ground without dressing the grinding wheel.

The RAM 33 storing the foregoing data is backed up by a backup battery to prevent the accidental destruction of the data stored therein.

The ROM 32 has a control program storage area 321 storing control programs for controlling the numerically controlled grinding machine 50 according to the NC data, and an automatic grinding data determining program storage area 322 storing automatic grinding data determining programs for automatically determining the foregoing grinding data.

The numerical control unit 30 is connected through the IF 34 to an operator's console 20 provided with a keyboard 22 for entering input data, and a CRT display 23 for displaying data.

(3) Operation

Procedures to be executed by the CPU 31 of the numerically controlled grinding machine in this embodiment will be described with reference to an automatic grinding data determining program shown in FIG. 3.

1. Entry of Tool Data and Workpiece Data

In step 100, the tool data is entered by operating the keyboard 22 and the tool data is stored in the tool data storage area 333 of the RAM 33.

Figure 4:
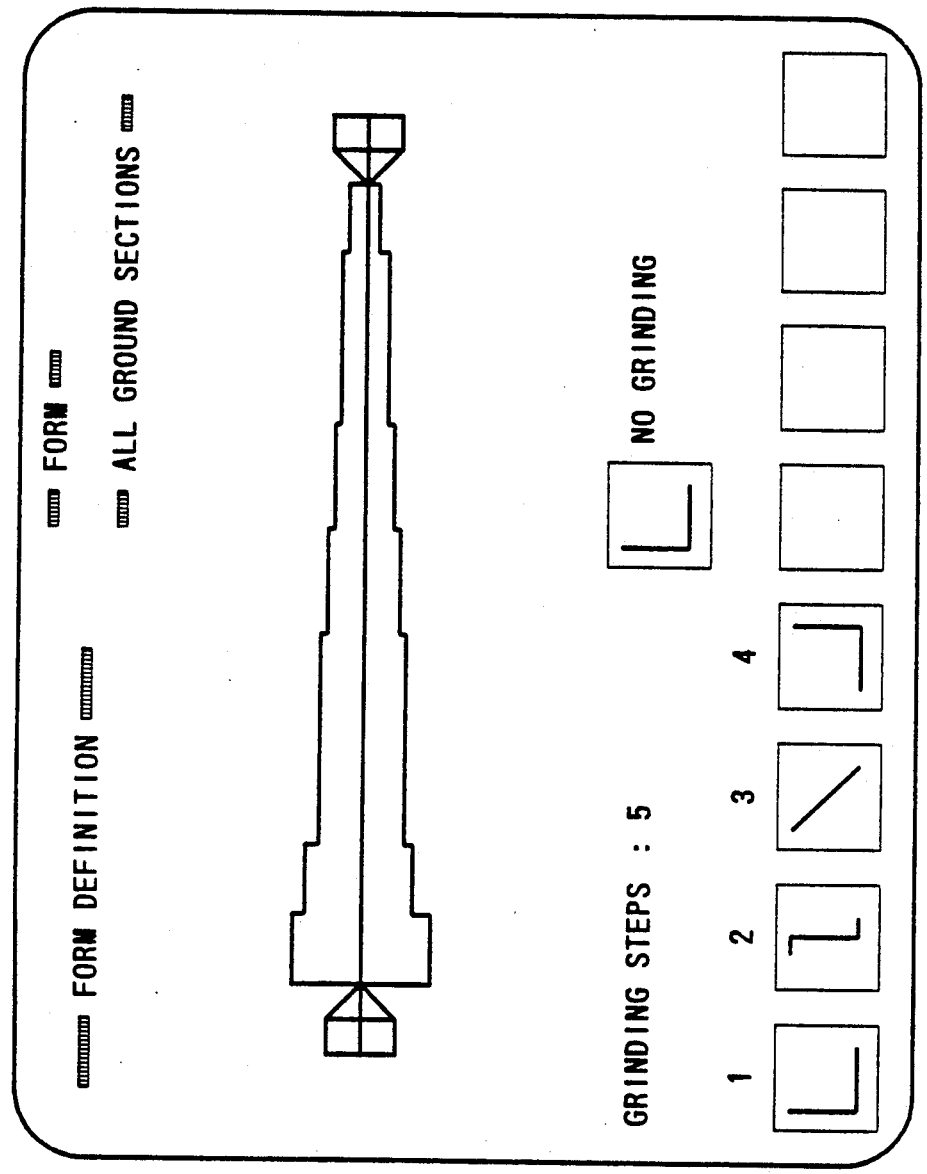
FIG. 4 is a view explaining a method of entering data representing the form of a workpiece.

In step 102, the workpiece data is entered. As shown in FIG. 4, the general form of the workpiece is generated by selecting a basic form displayed on the CRT 23 and specifying dimensions. Also entered are the material, machining allowances, grinding accuracies, designations of grinding with a sizing device (hereinafter referred to as a "size grinding".) The machining allowances, grinding accuracies and designations of size grinding are input for the respective ground sections.

2. Determination of the Grinding Cycle

Figure 5:
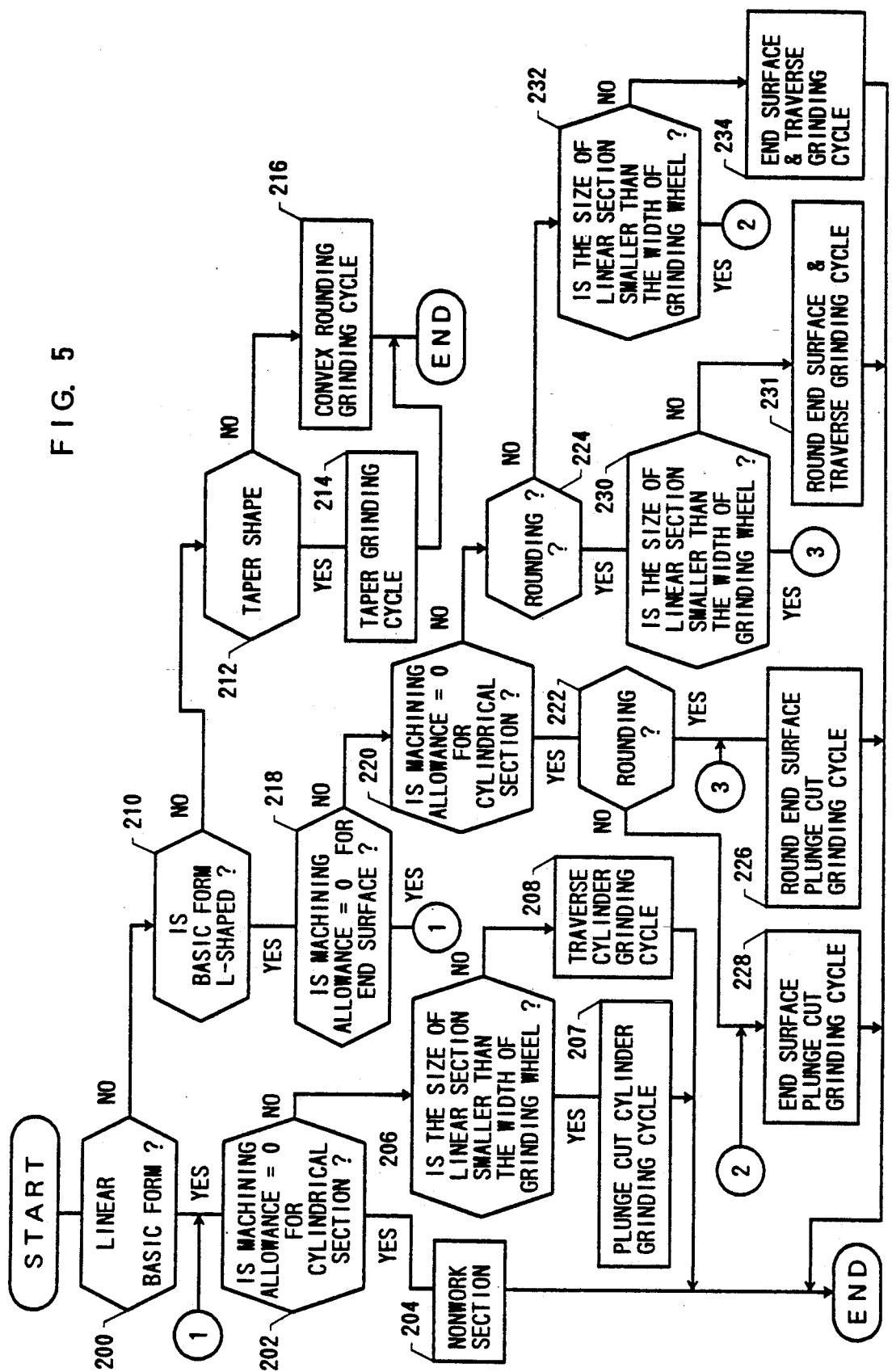

A program shown in detail in FIG. 5 is executed in step 104. The grinding cycle determining operation is executed for each input basic form. In step 200, it is judged whether or not the basic form is linear. If the judgment in step 200 is affirmative, it is judged in step 202 whether or not the machining allowance of a cylindrical section represented by a linear basic form is null. If the judgment in step 202 is affirmative, data indicating that the cylindrical section is a nonwork section is stored in the grinding data storage area 334 in step 204. If the machining allowance of the cylindrical section is not null, it is judged in step 206 whether or not the size of the linear section is smaller than the width of the grinding wheel. If the judgment in step 206 is affirmative, data designating a plunge cut cylinder grinding cycle (FIG. 6, (1)) for the linear section is stored in the grinding data storage area 334 in step 207. If the judgment in step 206 is negative, data designating a traverse cylinder grinding cycle for the linear section is stored in the grinding data storage area 334 in step 208.

On the other hand, if the judgment in step 200 is negative, it is judged in step 210 whether or not the basic form is an L-shape. If the judgment in step 210 is negative, it is judged in step 212 whether or not the basic form is a taper shape. If the judgment in step 212 is affirmative, data designating a taper grinding cycle (FIG. 6, (5)) for the taper section is stored in the grinding data storage area 334. If the judgment in step 212 is negative, data designating convex rounding grinding cycle (FIG. 6, (6)) for the ground section having the basic form is stored in the grinding data storage area 334.

If the judgment in step 210 is affirmative, it is judged in step 218 whether or not the machining allowance of the end surface is null. If the judgment in step 218 is affirmative the current executive step moves to step 202, and, if the judgment in step 218 is negative, the current executive step moves to step 220. If it is decided that the machining allowance of the cylindrical section is null, the current executive step moves to step 222, and, if the machining allowance of the cylindrical section is not null, the current executive step moves to step 224. In steps 222 and 224, it is judged whether or not the basic form has a round portion. If the judgement in step 222 is affirmative, data designating a round end surface plunge cut grinding cycle (FIG. 6, (7)) for the ground section having the basic form is stored in the grinding data storage area 334.

Figure 6:
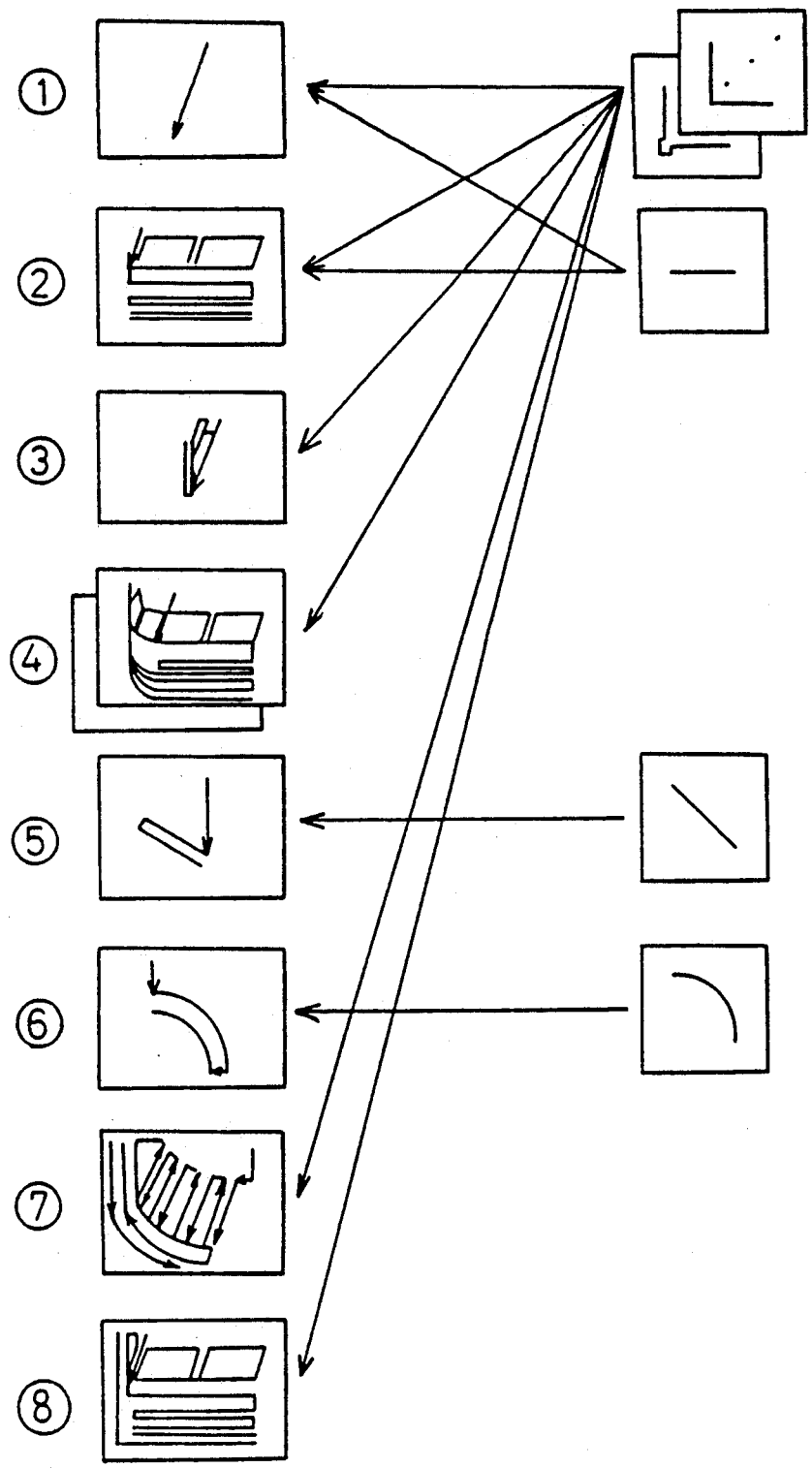
FIG. 6 is a pictorial view explaining a method of determining grinding cycles on the basis of the representing the form of a workpiece.

On the contrary, if the judgement in step 222 is negative, data designating an end surface plunge cut grinding cycle (FIG. 6, (3)) for the ground section of the basic form is stored in the grinding data storage area 334.

If the judgement in step 224 is affirmative, the current executive step moves to step 230, and, if the judgement in step 224 is negative, the current executive step moves to step 232. In steps 230 and 232, it is judged whether or not the length of the straight section, i.e., the cylindrical section, is smaller than the width of the grinding wheel. If the judgment in step 230 is affirmative, data designating the round end surface plunge cut grinding cycle (FIG. 6, (7)) for the ground section having the basic form is stored in the grinding data storage area 334. If the judgment in step 230 is negative, data designating a round end surface and traverse grinding cycle (FIG. 6, (4)) for the ground section having the basic form is stored in the grinding data storage area 334.

If the judgement in step 232 is affirmative, data designating an end surface plunge cut grinding cycle for the ground section having the basic form is stored in the grinding data storage area 334 in step 228. If the judgment in step 232 is negative, an end surface and traverse grinding cycle (FIG. 6, (8)) for the ground section having the basic form is stored in the grinding data storage area 334 in step 234.

The foregoing procedure is executed for each basic form to determine grinding cycles for the respective basic forms.

3. Determination of Grinding Conditions

Figure 3:
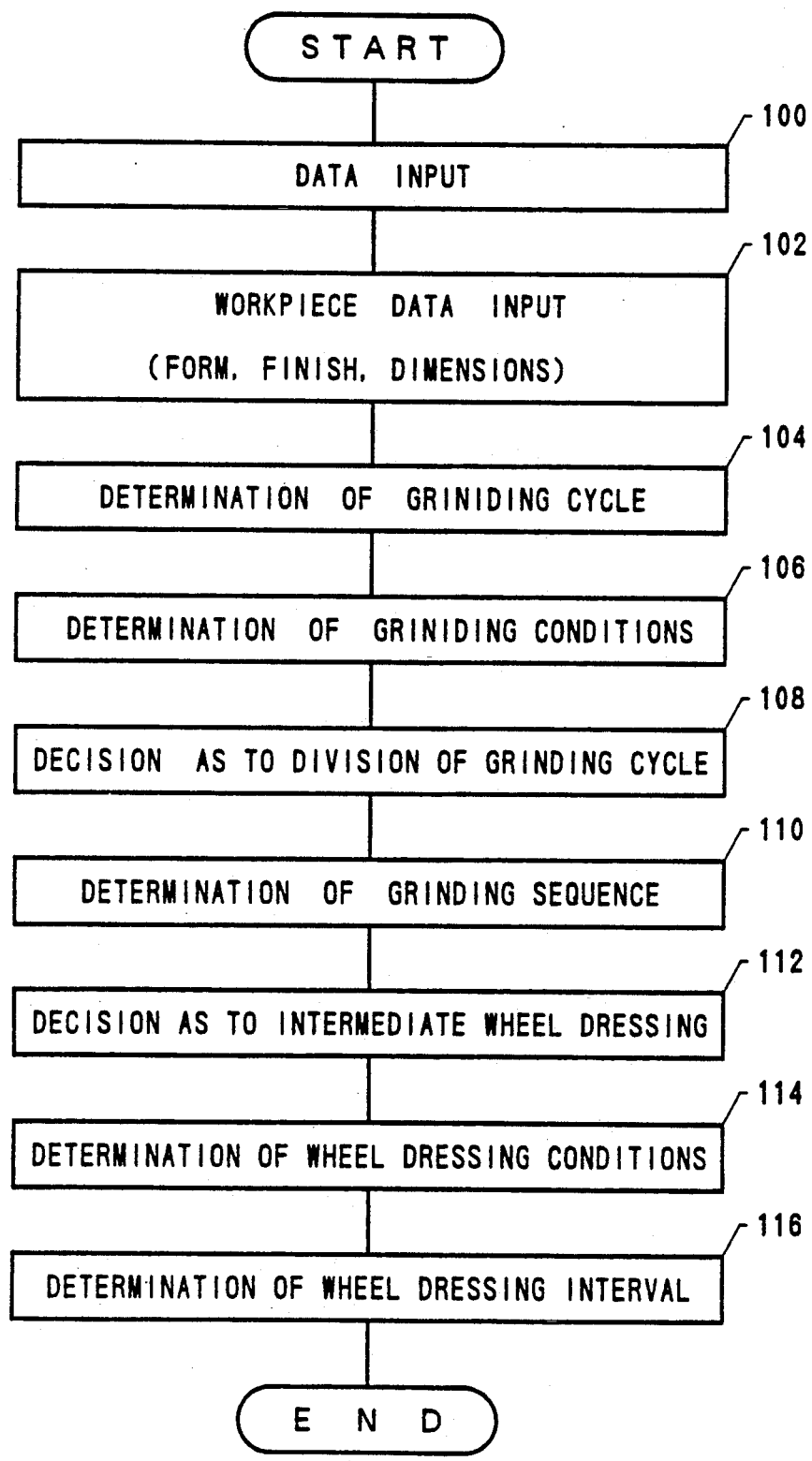
FIGS. 3, 5, 8, 10, 11 and 12 are flow charts of procedures to be executed by a CPU included in the numerical control system of FIG. 2.
Figure 7:
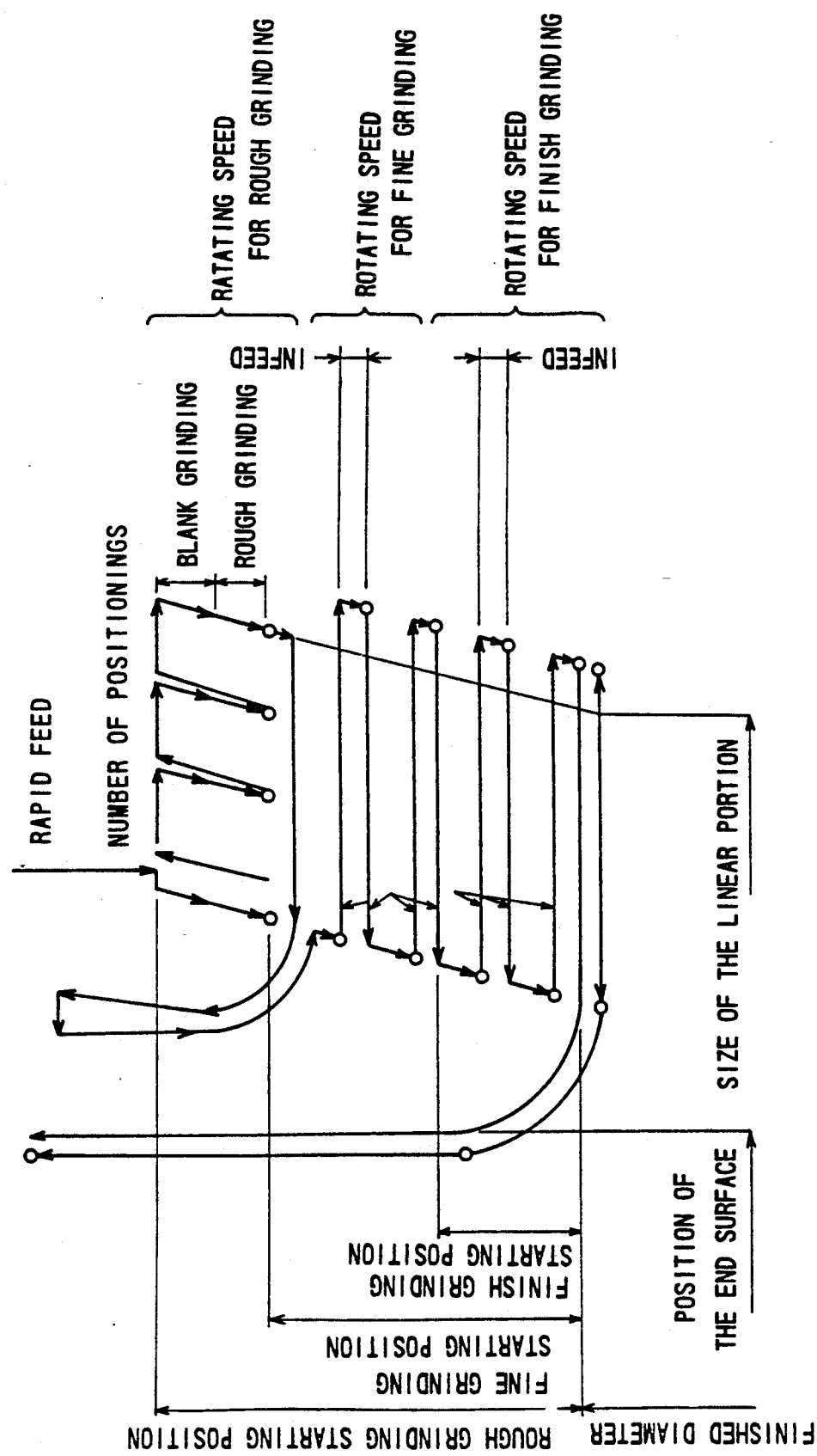
FIG. 7 is a diagram of assistance in explaining the relation between a grinding cycle and grinding conditions.

After the grinding cycles have been determined, step 106 of FIG. 3 for determining grinding conditions for each grinding cycle is executed. In determining grinding conditions, for example, for a round end surface and traverse grinding cycle as shown in FIG. 7, a rough grinding starting position, a fine grinding starting position, a finish grinding starting position, a rough grinding infeed amount, a rough grinding workpiece speed and an infeed rate and the like are calculated on the basis of the input workpiece data entered in step 102 including the finished diameter, position of the end surface, the dimension of the linear section, the surface roughness and the machining allowance.

Grinding conditions include a rough grinding workpiece speed, a fine grinding workpiece speed, a finish grinding workpiece speed, a rough grinding starting diameter, a fine grinding starting diameter, a finish grinding starting diameter, a rough grinding infeed rate, a fine grinding infeed rate, a finish grinding infeed rate, a rough grinding spark-out time and a finish grinding spark-out time.

These grinding data are calculated as follows. As for the rotating speed of the workpiece, the surface speed of the workpiece is defined previously by a function of the surface roughness required of the workpiece. Therefore, the surface speed of the workpiece is calculated on the basis of the specified surface roughness of the workpiece, and then the rotating speed of the workpiece is calculated on the basis of the calculated surface roughness and the diameter of the workpiece.

As for the grinding rate in each grinding step (rough grinding, fine grinding and finish grinding), the depth of cut of the grinding wheel for one turn of the workpiece is defined previously by a function of the dimensional tolerance. The depth of cut is calculated on the basis of a specified dimensional tolerance for each grinding step, and the infeed rate is calculated on the basis of the calculated depth of cut and the rotating speed of the grinding wheel.

The grinding starting diameter in each grinding step is calculated on the basis of the relation between a standard infeed for each grinding mode and the specified finished diameter. As for sparking-out, the rotating number of the workpiece for sparking-out is decided in accordance with whether or not size grinding is selected and whether or not the grinding cycle is to be divided. The sparking-out rotating number is determined on the basis of fixed conditions, and the spark-out time is calculated on the basis of the rotating number.

The foregoing grinding conditions are determined for each grinding cycle; accordingly, the grinding conditions are specific to the type of the grinding cycle (grinding mode). For example, the rotating speed of the workpiece is 100%, 70% and 110% for a plunge cut grinding cycle, a traverse grinding cycle and an end surface grinding cycle, respectively.

4. Decision of Grinding Cycle Division

Figure 8:
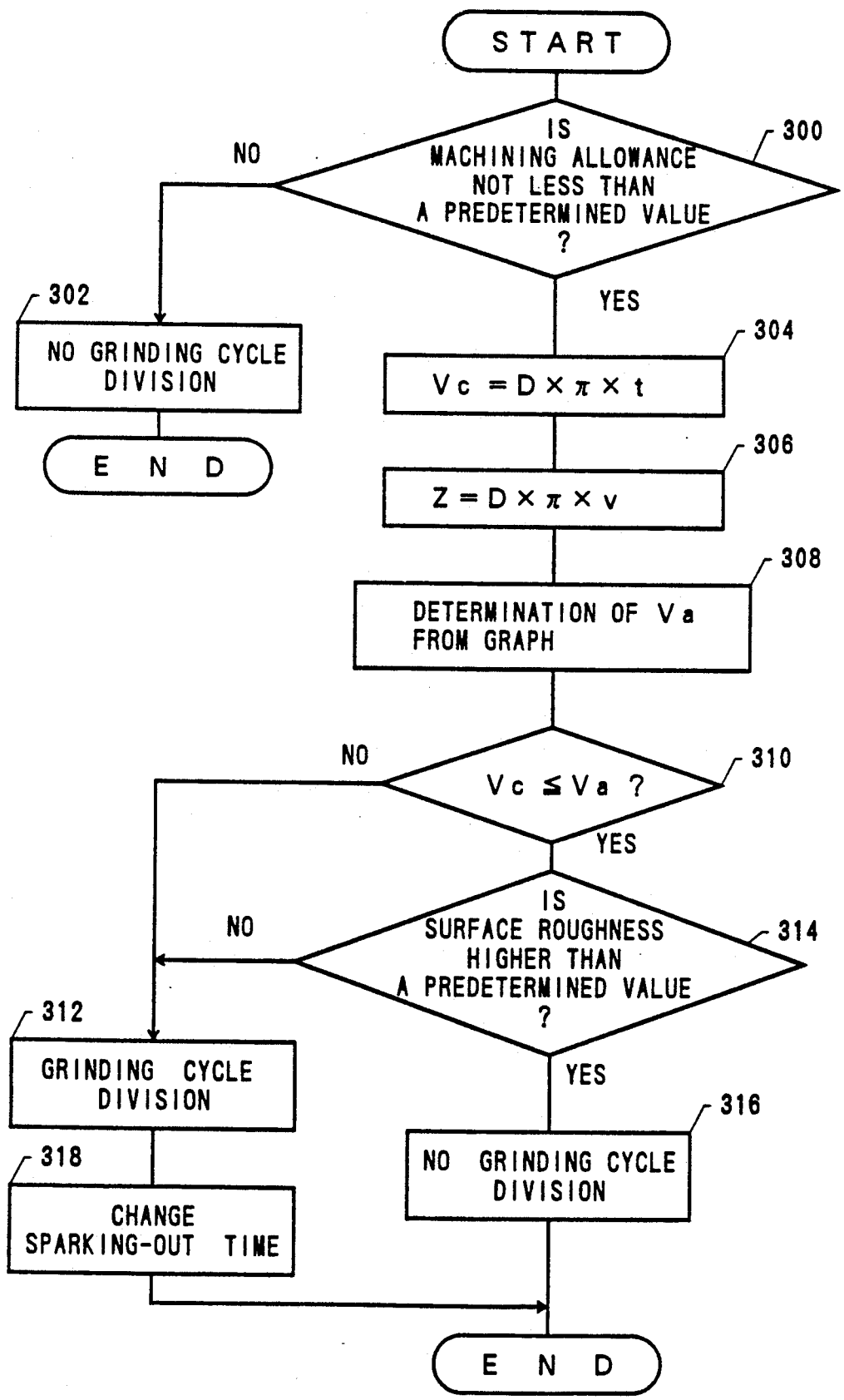

After the grinding conditions have been determined in step 106, a grinding cycle dividing procedure shown in FIG. 8 is executed in step 108.

In step 300, it is judged whether or not the machining allowance is not less than a predetermined value. If the judgment in step 300 is negative, no grinding cycle division is decided in step 302 and hence the grinding cycle stored in the grinding data storage area 334 is not divided. If the judgment in step 300 is affirmative, an actual grinding amount Vc, i.e., an accumulated amount of material that is to be ground in an actual grinding operation by the grinding wheel after dressing, in each grinding cycle is calculated in step 304 by using a formula:

$$Vc = D \cdot \pi \cdot t \tag{1}$$

where D is the finished diameter and t is the machining allowance. A grinding efficiency Z is calculated in step 306 by using a formula:

$$Z = D \cdot \pi \cdot v \tag{2}$$

where v is the rough grinding infeed rate.

Data representing the relation between the quantity of material which can be ground within the set surface roughness without the grinding wheel dressing, namely, an allowable grinding amount Va, and the grinding efficiency Z is stored previously in the ROM 32. Generally, in this relation, the greater the grinding efficiency, the smaller is the allowable grinding amount Va.

In step 308, the allowable grinding amount Va corresponding to the grinding efficiency Z determined in step 306 is determined. In step 310, the actual grinding amount Vc and the allowable grinding amount Va are compared. If the actual grinding amount Vc is greater than the allowable grinding amount Va, an instruction requesting dividing the grinding cycle is added in step 312 to the grinding cycle data stored previously in the grinding data storage area 334. In step 318, the sparking-out time is changed in response to insertion of a grinding wheel dressing step in the grinding cycle.

On the other hand, if it is decided in step 310 that the actual grinding amount Vc is not greater than the allowance grinding amount Va, it is judged in step 314 whether or not a desired surface roughness is higher than a predetermined value. If the judgment in step 314 is negative, namely, the desired surface roughness is lower than the predetermined value, i.e., the surface is requested to be relatively finely ground, the division of the grinding cycle is decided in step 312 in order to finish the surface of the workpiece in the desired surface roughness. If the judgment in step 314 is affirmative, it is decided in step 316 that the grinding cycle need not be divided because the surface of the workpiece can be ground in the desired surface roughness even if the grinding operation is continued without dressing the grinding wheel during the grinding cycle.

5. Determination of Grinding Sequence

Figure 9:
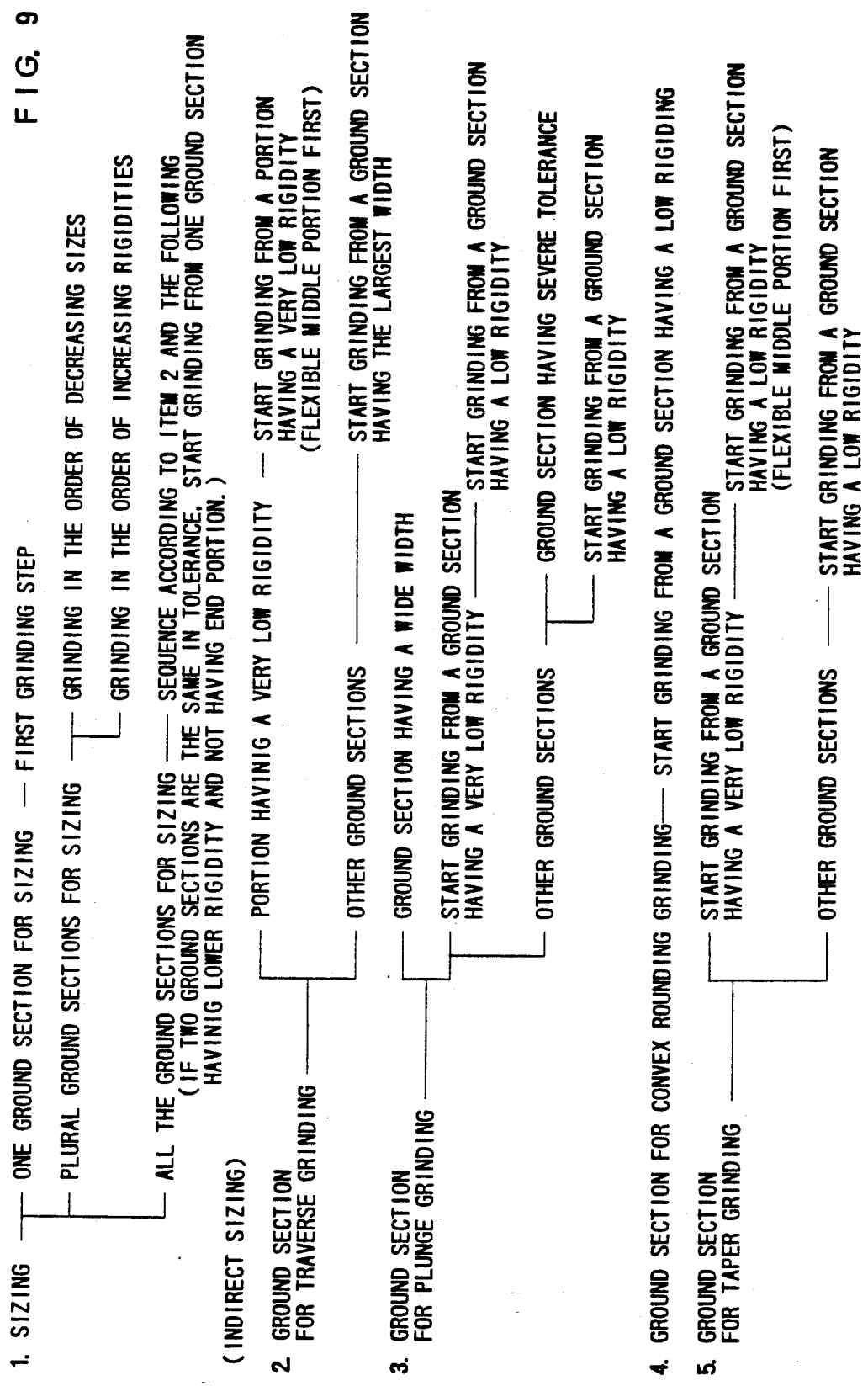
FIG. 9 is chart explaining a rule of determining a grinding sequence.

After decision has been made as to whether or not the grinding cycle is to be divided, step 110 of FIG. 3 is executed to determine grinding sequence according to a rule shown in FIG. 9.

First, a ground section to which sizing is assigned is ground. Other ground sections to which the traverse grinding, the plunge cut grinding, the convex rounding grinding and the taper grinding are assigned, respectively, are ground in that order. If there are a plurality of ground sections to which sizing is assigned, the ground sections are ground successively in the order of decreasing the dimensional tolerances. If there are ground sections which are the same in the dimensional tolerance, the ground sections to which the traverse grinding, the plunge cut grinding, the convex rounding grinding and the taper grinding are assigned are ground in that order.

As regards grinding sequence in respect of the type of grinding cycle, the ground sections are ground in the order of increasing the rigidities or in the order of decreasing the grinding widths.

6. Decision of Intermediate Wheel Dressing

Figure 10:
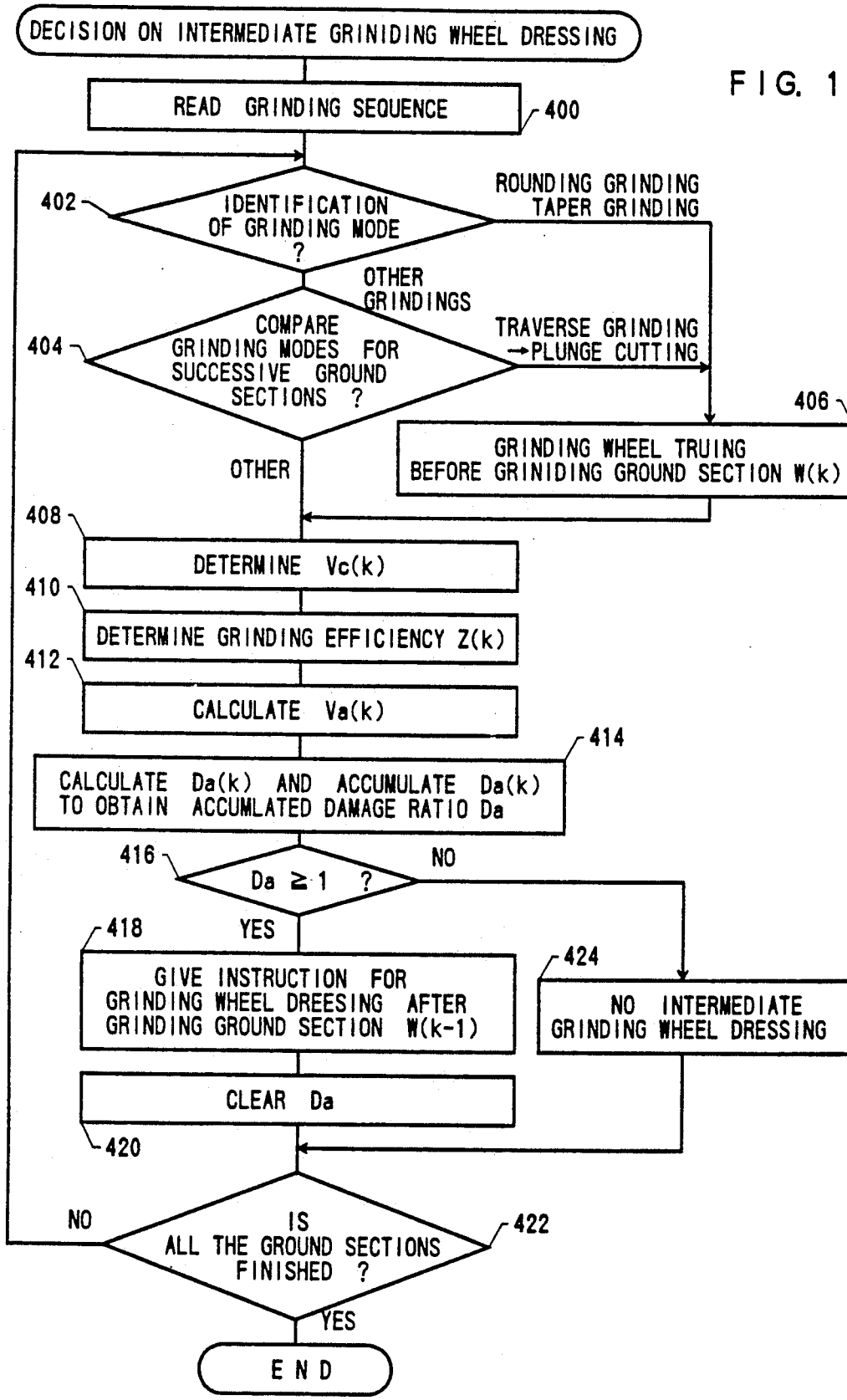

After the grinding sequence has been determined in step 110 of FIG. 3, a decision is made in step 112 as to whether or not the grinding wheel dressing needs to be performed during grinding all the ground sections of the workpiece. A procedure of deciding the grinding wheel dressing will be described with reference to a flow chart shown in FIG. 10.

Decisions are made as to whether or not the grinding wheel dressing is necessary before finishing grinding of all the ground sections of the workpiece and, if the grinding wheel dressing is necessary, the grinding wheel dressing must be carried out in grinding the workpiece according to the grinding sequence determined in step 110. The procedure of the decision of the intermediate grinding wheel dressing will be described hereinafter.

Figure 16:
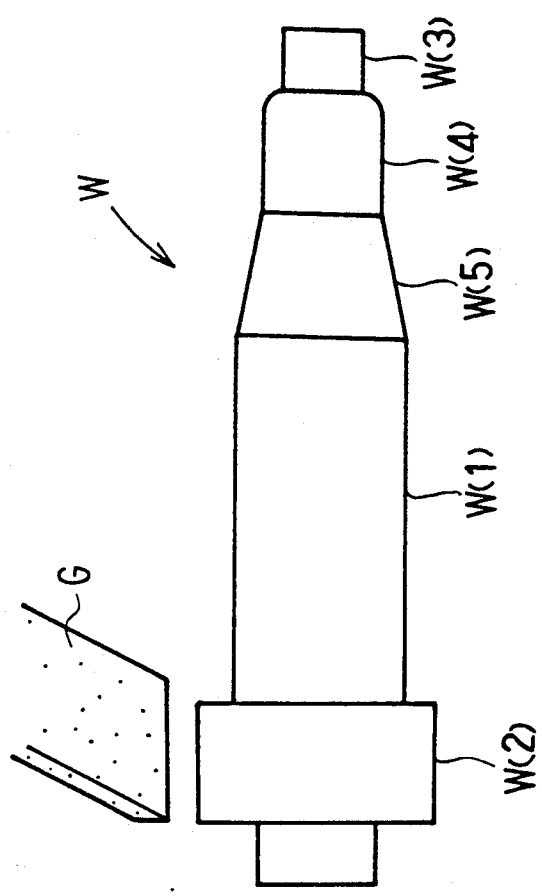
FIG. 16 is a front view of a workpiece by the numerically controlled grinding machine of FIG. 1.

The workpiece W has five ground sections W(1) to W(5) as shown in FIG. 16 and the grinding sequence determined in step 110 specifies grinding the ground sections W(1) to W(5) in that order.

In step 400, the grinding sequence is read from the grinding data storage area 334 of the RAM 33. The workpiece data of the ground sections W(k) (k=1, 2, 3, 4 and 5) are read sequentially from the grinding data storage area 334 in order specified by the grinding sequence.

In step 402, it is judged whether or not the grinding mode for the ground section W(k) is the rounding grinding or taper grinding. If the grinding mode is the rounding grinding, the edge of the cutting face of the grinding wheel G must be rounded as shown in FIG. 17(c) by a grinding wheel truing including dressing. If the grinding mode is the taper grinding, the cutting face of the grinding wheel G must be tapered as shown in FIG. 17(b) by the grinding wheel truing. Accordingly, if the grinding mode is the rounding grinding or taper grinding, step 406 is executed according to the grinding mode for the intermediate grinding wheel truing including dressing before grinding the ground section W(k). If the grinding mode is neither the rounding grinding nor taper grinding, the current executive step moves to step 404. In step 404 the grinding mode for the ground section W(k), for example, the ground section W(5), and the grinding mode for the preceding ground section W(k−1), for example, the ground section W(4), are compared to judge whether or not the traverse grinding is changed for the plunge cut grinding. The grinding wheel is subject to stepped abrasion as shown in FIG. 17(a) during the traverse grinding and the grinding wheel having the stepped cutting face lowers the accuracy of the ground section. Therefore, if the grinding mode is changed from the traverse grinding to the plunge cut grinding, in step 406 it is decided that the intermediate grinding wheel truing including dressing is executed before grinding the ground section W(k). If the grinding mode is not changed from the traverse grinding to the plunge cut grinding, the current executive step moves to step 408.

In steps 408 and 410, the actual grinding amount Vc(k) and the grinding efficiency Z(k) for the grinding cycle for the kth ground section W(k) are calculated by using formulas (1) and (2). In step 412, the allowable grinding amount Va(k) in grinding the kth ground section W(k) at the grinding efficiency Z(k) in the grinding cycle is calculated by using a formula:

$$Va(k) = a_2/(a_1 Z(k)) \tag{3}$$

where $a_1$ and $a_2$ are constants dependent on the material of the workpiece. In step 414, damage ratio Da(k) for the grinding wheel is calculated by using a formula:

$$Da(k) = Vc(k)/Va(k) \tag{4}$$

and then accumulative damage ratio Da, namely, the sum of the damage ratios for the first ground section to the kth ground section is obtained by using:

$$Da = \sum_k Da(k) \quad (5)$$

Then, it is judged in step 416 whether or not the accumulative damage ratio Da is equal to or greater than 1. If the judgement in step 416 is negative, in step 424 no execution of the intermediate grinding wheel dressing is decided. And moving to step 422, it is judged whether or not the calculation of all the ground sections have been finished. If the judgement in step 422 is negative, the current executive step returns to step 402, the ground section number k is incremented by 1, and then the same steps 402 to 422 are executed for the next ground section.

During executing the loop of steps 402 to 422, the in case that it is decided that the accumulative damage ratio Da is greater than 1 for the kth ground section, in next step 418 an intermediate grinding wheel dressing instruction is inserted between the grinding cycles for the k−1 th ground section and the kth ground section. In step 420, the accumulative damage ratio Da is cleared to zero, and then it is judged in step 422 whether or not the calculation of all the ground sections have been finished. If the judgment in step 422 is negative, the current executive step returns to step 402 and, if the judgement in step 422 is affirmative, the execution of the program is terminated.

7Determination of Wheel Dressing Conditions

Figure 11:
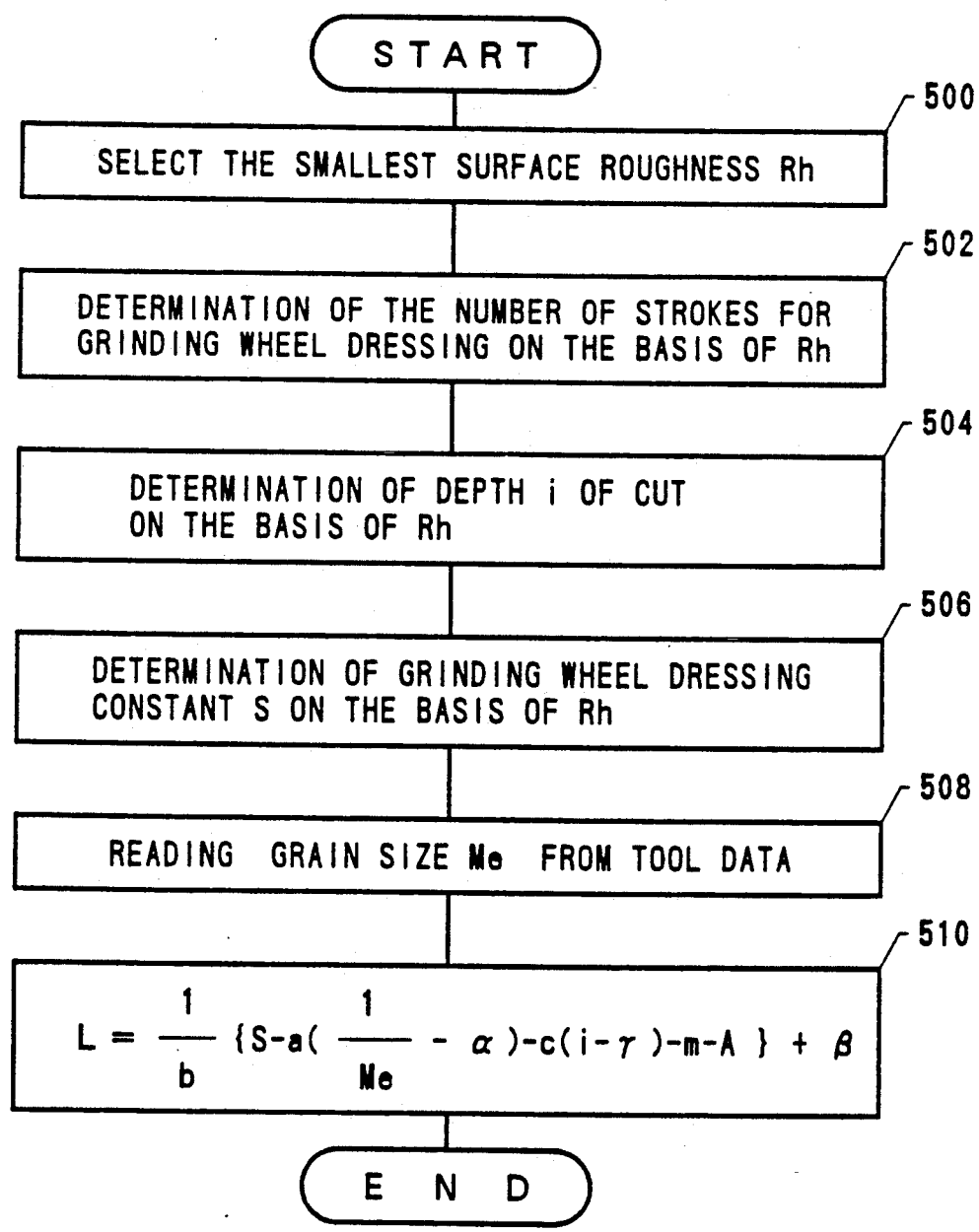

After the termination of step 112 for the decision of the intermediate grinding wheel dressing, step 114 is executed for the determination of the grinding wheel dressing conditions. A procedure for the determination of the grinding wheel dressing conditions will be described with reference to a flow chart shown in FIG. 11.

In step 500, the minimum surface roughness Rh among those for all the ground sections of the workpiece is selected from the workpiece data. A table containing values of the number of strokes of traverse motion of the dressing tool relative to the grinding wheel, the depth i of cut by the dressing tool and the grinding wheel dressing constant S for roughness ranks is stored beforehand in the RAM 33. Values of the foregoing particulars including the number of strokes for a roughness rank to which the minimum surface roughness Rh belongs are selected from the table in steps 502, 504 and 506.

In step 508, the grain size of the grinding wheel entered in step 100 (FIG. 3) is read, and the lead L of the dressing tool, namely, the infeed amount of the dressing tool against one complete turn of the grinding wheel, is calculated by using an empirical formula:

$$L = 1/b \cdot \{S - a(1/Me - \alpha) - c(i - \gamma) - m - A\} + \beta \quad (6)$$

where a=a coefficient of grain size, b=a coefficient of lead, c=a coefficient of depth of cut, $\alpha$=a standard grain size, $\beta$=a standard lead, $\gamma$=a standard depth of cut, A=a standard surface roughness, Me=a grain size and m=a material constant. The execution of the program is terminated after the completion of step 510.

8. Determination of Wheel Dressing Interval

Figure 12:
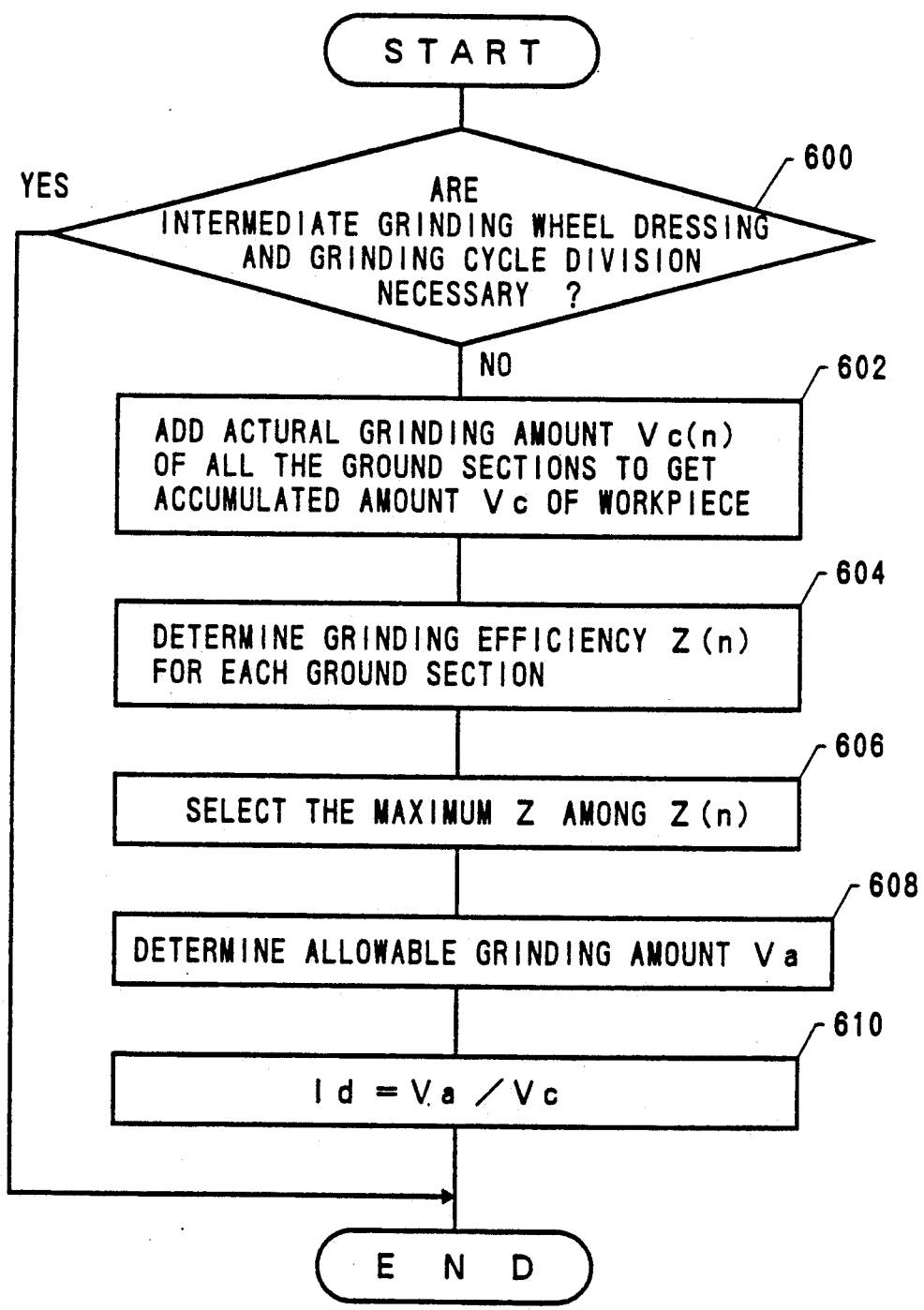

After the determination of the grinding wheel dressing conditions in step 114 of FIG. 3, step 116 is executed to determine the number of workpieces that can be ground in a grinding wheel dressing interval. A procedure to be carried out by the CPU 31 to insert the grinding wheel dressing step in the grinding process once every completion of machining the determined number of workpieces will be described hereinafter with reference to a flow chart shown in FIG. 12.

In step 600, it is judged whether or not the grinding wheel dressing step is included in the grinding data determined by the foregoing procedures for a grinding cycle for grinding one workpiece. If the judgment in step 600 is affirmative, the execution of this program is terminated.

If the judgment in step 600 is negative, the actual grinding amount Vc(n) of each ground section W(n) is calculated. And the actual amounts Vc(n) of the respective ground sections are added for all n, i.e., the number of the ground sections of one workpiece, to obtain actual grinding amount $Vc(=\Sigma Vc(n))$ of the workpiece in step 602.

In step 604, the grinding efficiency Z(n) for each ground section W(n) is determined. In step 606, the maximum grinding efficiency Z is selected. In step 608, the allowable grinding amount Va corresponding to the maximum grinding efficiency Z is determined. In step 610, the number of workpieces that can be ground in one grinding wheel dressing interval, i.e., Va/Vc is calculated and then the execution of the program is terminated. Thus, all the data are determined automatically. All the data determined by the foregoing procedures of automatic data determination as shown in FIG. 13 are stored in the RAM 331.

Thus, the complete grinding data can automatically determined.

9. Control of Grinding Operation

Figure 15:
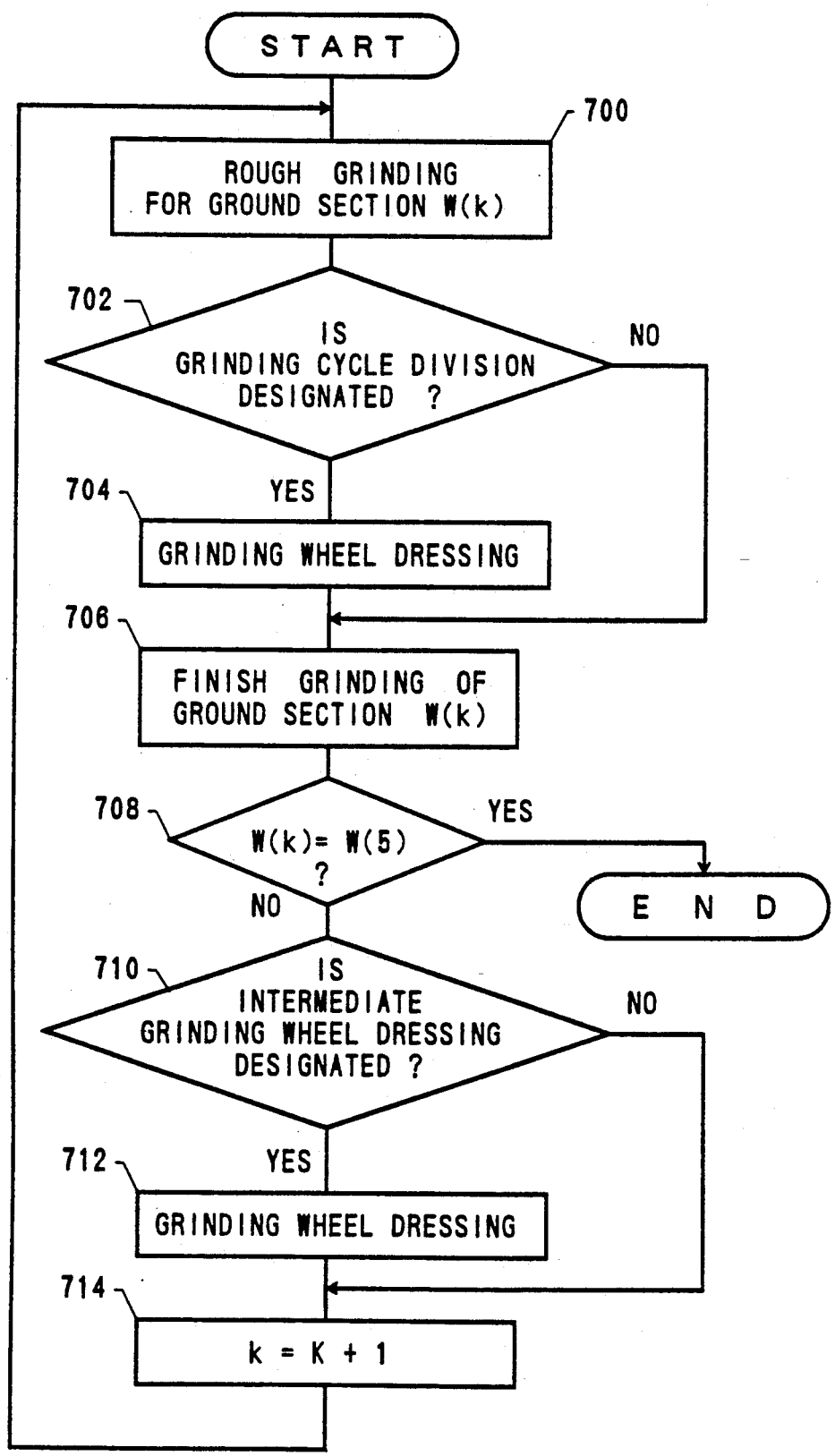
FIG. 15 is a flow chart of a control procedure of controlling the grinding operation of the numerically controlled grinding machine of FIG. 1.

FIG. 15 is a flow chart of a procedure of the grinding cycle division and the intermediate grinding wheel dressing in actually machining a workpiece according to the grinding sequence.

In step 700, the machining of the ground section W(k) of a workpiece W is started for the blank grinding and rough grinding.

Then, in step 702, it is judged whether or not the grinding cycle division is designated to the grinding cycle for the ground section W(k). If the judgement in step 702 is affirmative, in step 704 the grinding wheel dressing operation is executed and then the current executive step moves to step 706. If the judgement in step 702 is negative, the current executive step moves to step 706.

In step 706, the fine grinding and finish grinding of the ground section W(k) is carried out. After the completion of the finish grinding of the ground section W(k), step 708 is executed.

In step 708, it is judged whether or not the ground section W(k) that has just been finished is the last ground section W(5). If the judgment in step 708 is affirmative, the machining operation for the workpiece W is terminated. If the judgement in step 708 is negative, step 710 is executed.

In step 710, it is judged whether or not any instruction is given to carry out the intermediate grinding wheel dressing after the completion of the machining of the ground section W(k). If the judgment in step 710 is affirmative, step 712 is executed for the dressing of the grinding wheel G. If the judgment in step 710 is negative, the execution step jumps to step 714.

In step 714, the number k of the ground section is incremented by 1, i.e., k=k+1, and then the current execution step returns to step 700 to start machining the next ground section.

As is apparent from the foregoing description, the numerically controlled grinding machine embodying the present invention has a function to decide whether or not the grinding cycle division is designated and a function to decide whether or not the intermediate grinding wheel dressing is designated, and is capable of automatically determining the grinding wheel dressing frequency necessary for machining the workpieces.

What we claim is:

1. A numerically controlled grinding machine capable of determining grinding conditions on the basis of input machining data and of carrying out a grinding cycle comprising a plurality of grinding steps differing in an infeed rate of a grinding wheel to grind a workpiece, said numerically controlled grinding machine comprising:

abrasion estimating means for estimating an abrasion of said grinding wheel in said grinding cycle on the basis of said input machining data and said grinding conditions;

grinding cycle dividing means for dividing said grinding cycle into a plurality of grinding stages according to said estimated abrasion; and grinding wheel dressing means for dressing said grinding wheel once every completion of said respective divided grinding stages.

2. A numerically controlled grinding machine capable of determining grinding conditions on the basis of input machining data and of carrying out a grinding cycle comprising a plurality of grinding steps differing in an infeed rate of a grinding wheel to grind a workpiece, said numerically controlled grinding machine comprising:

grinding amount calculating means for calculating an allowable grinding amount indicating an amount of material that can be ground by said grinding wheel within a set surface roughness and an actual grinding amount indicating an amount of material that is to be ground by said grinding wheel in said grinding cycle on the basis of said input machining data and said grinding conditions;

machining cycle dividing means for dividing said grinding cycle into a plurality of grinding stages when said calculated actual grinding amount is greater than said calculated allowable grinding amount; and grinding wheel dressing means for dressing said grinding wheel once every completion of said respective divided grinding stages.

3. A numerically controlled grinding machine capable of grinding a workpiece having a plurality of ground sections with a grinding wheel according to grinding conditions for each of said ground sections and a grinding sequence indicating a grinding order among said ground sections which are determined on the basis of input machining data for each of said ground sections; said numerically controlled grinding machine comprising:

abrasion estimating means for estimating the abrasion of said grinding wheel in grinding each of said ground sections on the basis of said input machining data and said grinding conditions;

accumulative abrasion estimating means for estimating an accumulative abrasion of said grinding wheel in grinding each of said ground sections according to said grinding sequence; and intermediate grinding wheel dressing timing determining means for determining at least one of said ground sections after grinding which a grinding wheel dressing is to be carried out in order that said accumulative abrasion estimated by said accumulative abrasion estimating means may not exceed a predetermined value.

4. A numerically controlled grinding machine capable of grinding a workpiece having a plurality of ground sections with a grinding wheel according to grinding conditions for each of said ground sections and a grinding sequence indicating a grinding order among said ground sections which are determined on the basis of input machining data for each of said ground sections; said numerically controlled grinding machine comprising:

grinding amount calculating means for calculating an allowable grinding amount indicating an amount of material that can be ground by said grinding wheel within a set surface roughness and an actual grinding amount indicating an amount of material that is to be ground by said grinding wheel for each of said ground sections on the basis of said input machining data and said grinding conditions;

damage ratio calculating means for calculating damage ratios indicating degrees of damage that said grinding wheel suffers in grinding each of said ground sections on the basis of said calculated actual grinding amount and said calculated allowable grinding amount;

damage ratio accumulating means for accumulating said damage ratios for said respective ground sections according to said grinding sequence; and intermediate grinding wheel dressing timing determining means for determining at least one of said ground sections after grinding which a grinding wheel dressing is to be carried out in order that said accumulative damage ratio calculated by said damage ratio accumulating means may not exceed a predetermined value.

5. A numerically controlled grinding machine capable of grinding a workpiece having a plurality of ground sections with a grinding wheel according to grinding conditions for each of said ground sections and a grinding sequence indicating a grinding order among said ground sections which are determined on the basis of input machining data for each of said ground sections; said numerically controlled grinding machine comprising:

abrasion estimating means for estimating abrasions of said grinding wheel in grinding each of said ground sections on the basis of said input machining data and said grinding conditions;

abrasion accumulating means for accumulating said abrasions of the grinding wheel in grinding said respective ground sections according to said grinding sequence and in the order of workpieces to be ground; and grinding wheel dressing timing determining means for determining a ground section after grinding which a grinding wheel dressing is to be carried out so that said accumulative abrasion calculated by said abrasion accumulating means may not exceed a predetermined value.

6. A numerically controlled grinding machine capable of grinding a workpiece having a plurality of ground sections with a grinding wheel according to grinding conditions for each of said ground sections and a grinding sequence indicating a grinding order among said ground sections which are determined on the basis of input machining data for each of said ground sections; said numerically controlled grinding machine comprising:

grinding amount calculating means for calculating an allowable grinding amount indicating an amount of material that can be ground by said grinding wheel within a set surface roughness and an actual grinding amount indicating an amount of material that is to be ground by said grinding wheel for each of said ground sections on the basis of said input machining data and said grinding conditions;

damage ratio calculating means for calculating damage ratios indicating degrees of damages that said grinding wheel suffers in grinding each of said ground sections of each of workpieces on the basis of said calculated actual grinding amount and said calculated allowable grinding amount;

damage ratio accumulating means for accumulating said damage ratios for said respective ground sections according to said grinding sequence and in the order of workpieces to be machined; and grinding wheel dressing timing determining means for determining a workpiece after grinding which a grinding wheel dressing is to be carried out in order that said accumulative damage ratio calculated by said damage ratio accumulating means may not exceed a predetermined value.

7. A numerically controlled grinding machine comprising:

grinding cycle determining means for determining, for each of ground sections of a workpiece to be ground by a grinding wheel, a grinding cycle comprising grinding steps including a rough grinding, a fine grinding, and a finish grinding, and grinding modes including a plunge cut grinding, a traverse grinding, and an end surface grinding, on the basis of workpiece data specifying attibutes of said workpiece including finished dimensional data of said workpiece, and material of said workpiece, and tool data specifying attributes of said grinding wheel including dimensional data of said grinding wheel and grain size of said grinding wheel;

grinding condition determining means for determining grinding conditions including an infeed rate, an infeed amount and a rotating speed of said workpiece in each of said grinding steps of said grinding cycle for each of said ground sections, on the basis of said workpiece data and said tool data;

grinding cycle division deciding means for deciding whether or not said grinding cycle for each of said ground sections needs to be divided into a plurality of grinding stages through a decision as to whether or not said grinding cycle for each of said ground sections can be completed without requiring a grinding wheel dressing, on the basis of an estimated abrasion of said grinding wheel estimated according to said grinding cycle and said grinding conditions;

grinding sequence determining means for determining a grinding sequence taking into consideration said workpiece data, said grinding cycle and a division or non-division of said grinding cycle;

intermediate grinding wheel dressing timing determining means for deciding, on the basis of said estimated abrasion of said grinding wheel that increases with progress of grinding operation, whether or not all of said ground sections of said workpiece can be finished without requiring a grinding wheel dressing during grinding said workpiece in accordance with said grinding sequence, and, if it is decided that all of said ground sections of said workpiece cannot completely be ground without requiring said grinding wheel dressing, setting an intermediate grinding wheel dressing timing in said grinding sequence;

grinding wheel dressing condition determining means for determining conditions of said grinding wheel dressing on the basis of said tool data and a required surface accuracy of a ground surfaces of each of ground sections ground after dressing said grinding wheel and said tool data; and grinding wheel dressing interval determining means for determining a grinding wheel dressing interval on the basis of said grinding wheel dressing conditions in case that it is decided that all of said ground sections of said workpiece can completely be ground without requiring said grinding wheel dressing.

8. A numerically controlled grinding machine according to claim 7, wherein said grinding cycle dividing means estimates said abrasion of a cutting face of said grinding wheel that increases with progress of a grinding process according to said grinding cycle for each of said ground sections and said grinding conditions, and decides whether or not it is necessary to divide said grinding cycle for each of said ground sections, specifying a procedure of sequentially finishing each of said ground sections or a procedure of interrupting said grinding cycle for a ground section at a predetermined grinding mode and grinding the other ground sections before finishing the former ground section, by deciding whether or not each of said ground sections can completely be ground without requiring said grinding wheel dressing on the basis of said estimated abrasion of said cutting face of said grinding wheel and said required accuracy of said ground surface in each of said grinding modes of each of said ground sections.

9. A numerically controlled grinding machine according to claim 7, wherein said intermediate grinding wheel dressing timing determining means decides, on the basis of said estimated abrasion of said cutting face of said grinding wheel that increases with progress of grinding process in grinding said workpiece in accordance with said grinding sequence, and said required accuracy of said ground surface in each of said grinding modes of each of said ground sections, in case that all of said ground sections of said workpiece can completely be finished without requiring said grinding wheel dressing, and sets an intermediate grinding wheel dressing timing in said grinding sequence in case that it is decided that all of said ground sections of said workpiece cannot completely be finished without requiring said grinding wheel dressing.

* * * * *